United States Patent
Miller et al.

(10) Patent No.: US 7,243,469 B2
(45) Date of Patent: Jul. 17, 2007

(54) TEXTURED LAMINATE FLOORING

(75) Inventors: Robert J. Miller, Dalton, GA (US); David M. Brownlee, Chattanooga, TN (US)

(73) Assignee: Columbia Insurance Company, Omaha, NE (US)

( * ) Notice: Subject to any disclaimer, the term of this patent is extended or adjusted under 35 U.S.C. 154(b) by 156 days.

(21) Appl. No.: 10/995,971

(22) Filed: Nov. 22, 2004
(Under 37 CFR 1.47)

(65) Prior Publication Data
US 2005/0079323 A1    Apr. 14, 2005

Related U.S. Application Data

(63) Continuation of application No. 10/283,002, filed on Oct. 29, 2002, now abandoned, and a continuation of application No. 09/770,581, filed on Jan. 26, 2001, now abandoned.

(51) Int. Cl.
*E04F 13/00* (2006.01)

(52) U.S. Cl. ............... 52/311.1; 52/311.2; 52/316; 52/589.1

(58) Field of Classification Search ........... 52/311.1, 52/311.2, 313, 316, 589.1, 592.1; 428/141, 428/142, 151, 156, 106, 67
See application file for complete search history.

(56) References Cited

U.S. PATENT DOCUMENTS

| | | | |
|---|---|---|---|
| 232,965 A | 10/1880 | Hastings | |
| 708,842 A | 9/1902 | Stille et al. | |
| 1,583,748 A | 5/1926 | Reuter-Lorenzen | |
| 1,845,579 A | 2/1932 | Borthwick | |
| 1,869,702 A | 8/1932 | MacChesney | |
| 2,027,292 A | 1/1936 | Rockwell | |
| 2,099,809 A | 11/1937 | Hunter et al. | |
| 2,108,226 A * | 2/1938 | Johnston | 404/42 |
| 2,245,468 A | 6/1941 | Dussol | |
| 2,392,574 A | 1/1946 | Brown | |
| 3,293,108 A * | 12/1966 | Nairn et al. | 428/159 |
| 3,373,068 A | 3/1968 | Grosheim et al. | |
| 3,373,071 A | 3/1968 | Fuerst | |
| 3,445,327 A | 5/1969 | Fuerst | |

(Continued)

FOREIGN PATENT DOCUMENTS

DE        6750305        1/1969

(Continued)

*Primary Examiner*—Carl D. Friedman
*Assistant Examiner*—Basil Katcheves
(74) *Attorney, Agent, or Firm*—Needle & Rosenberg, P.C.

(57) ABSTRACT

A decorated floor panel having a core with a top surface and an opposite bottom surface; a decorative layer coupled to the top surface of the core, the decorative layer having a desired aesthetic appearance; and a wear layer coupled to and substantially covering the decorative layer for protecting the decorative layer. The wear layer has an exposed wear surface with depressions therein of a variable depth below the wear surface, the depressions being arranged to display a desired texture pattern. It is noted that this abstract is provided to comply with the rules requiring an abstract that will allow a searcher or other reader to ascertain quickly the subject matter of the technical disclosure. The abstract is submitted with the understanding that it will not be used to interpret or limit the scope or meaning of the claims pursuant to 37 C.F.R. § 1.72(b).

25 Claims, 2 Drawing Sheets

U.S. PATENT DOCUMENTS

| | | | |
|---|---|---|---|
| 3,554,827 A * | 1/1971 | Yamagishi | 156/85 |
| 3,563,844 A | 2/1971 | Brown | |
| 3,616,127 A | 10/1971 | Guenther | |
| 3,718,496 A | 2/1973 | Willard | |
| 3,767,516 A | 10/1973 | Brady | |
| 3,823,046 A * | 7/1974 | Yamagishi | 156/220 |
| 3,860,470 A | 1/1975 | Jaisle et al. | |
| 3,887,678 A * | 6/1975 | Lewicki, Jr. | 264/284 |
| 3,953,639 A * | 4/1976 | Lewicki, Jr. | 428/160 |
| 3,962,009 A * | 6/1976 | Minami et al. | 156/85 |
| 3,968,291 A | 7/1976 | Chevallier | |
| 4,005,239 A | 1/1977 | Davis et al. | |
| 4,109,043 A | 8/1978 | DeLapp | |
| 4,112,169 A | 9/1978 | Huffman et al. | |
| 4,136,224 A * | 1/1979 | Minami et al. | 428/161 |
| 4,154,882 A | 5/1979 | Ungar et al. | |
| D258,536 S | 3/1981 | Kay | |
| 4,305,987 A | 12/1981 | Scher et al. | |
| 4,310,370 A * | 1/1982 | Arai et al. | 156/220 |
| 4,322,468 A | 3/1982 | Raghava | |
| 4,365,436 A | 12/1982 | Ritchey | |
| 4,374,886 A | 2/1983 | Raghava | |
| 4,625,491 A | 12/1986 | Gibson | |
| 4,678,528 A | 7/1987 | Smith et al. | |
| 4,731,139 A | 3/1988 | Feyerabend et al. | |
| 4,927,070 A | 5/1990 | Kretchmer | |
| 5,052,160 A | 10/1991 | Gentsch et al. | |
| 5,112,671 A | 5/1992 | Diamond et al. | |
| 5,122,212 A | 6/1992 | Ferguson et al. | |
| 5,304,272 A | 4/1994 | Rohrbacker et al. | |
| 5,425,986 A * | 6/1995 | Guyette | 428/141 |
| 5,736,227 A * | 4/1998 | Sweet et al. | 428/192 |
| 5,961,903 A * | 10/1999 | Eby et al. | 264/46.5 |
| 6,006,486 A | 12/1999 | Moriau et al. | |
| 6,114,008 A * | 9/2000 | Eby et al. | 428/151 |
| 6,228,463 B1 * | 5/2001 | Chen et al. | 428/160 |
| 6,247,285 B1 * | 6/2001 | Moebus | 52/589.1 |
| 6,401,415 B1 * | 6/2002 | Garcia | 52/311.1 |
| 6,423,167 B1 * | 7/2002 | Palmer et al. | 156/209 |
| 6,632,507 B2 | 10/2003 | Benton et al. | |
| 6,688,061 B2 | 2/2004 | Garcia | |
| 6,691,480 B2 | 2/2004 | Garcia | |
| 2002/0014047 A1 | 2/2002 | Thiers | |

FOREIGN PATENT DOCUMENTS

| | | |
|---|---|---|
| DE | 2409746 | 9/1975 |
| DE | 2747590 | 4/1978 |
| DE | 3142446 A1 | 5/1983 |
| DE | 3238708 A1 | 4/1984 |
| DE | 3223569 C2 | 8/1985 |
| ES | 163421 U | 5/1971 |
| ES | 460194 | 5/1978 |
| ES | 283331 U | 5/1985 |
| ES | 1019585 U | 4/1992 |
| GB | 1291690 | 10/1972 |
| GB | 1590540 | 6/1981 |
| WO | WO/97/31776 | 9/1997 |
| WO | WO 01-330011 A1 | 5/2001 |
| WO | WO01/96688 A1 | 12/2001 |
| WO | WO01/96689 A1 | 12/2001 |

* cited by examiner

TEXTURED LAMINATE FLOORING

This application is a continuation of, and claims priority to and the benefit of U.S. patent application Ser. No. 09/770,581, entitled "Textured Laminate Flooring," filed on Jan. 26, 2001 now abandoned, and Ser. No. 10/283,002, entitled "Textured Laminate Flooring," which was filed on Oct. 29, 2002 now abandoned, which are incorporated in its entirety in this document by reference.

BACKGROUND OF THE INVENTION

1. Field of the Invention

The present invention relates generally to flooring panels for use in commercial, industrial or residential environments. More particularly, this invention relates to flooring panels having an aesthetically pleasing appearance provided by texturing imparted to the surface of the panels. In certain embodiments, the texture is aligned in registration with a visible graphic design displayed by the panel to further enhance the aesthetic appearance of the flooring panel.

2. Background Art

Various laminates, including high pressure laminates and fiberboard core laminates, are commonly used in flooring applications. Fiberboard core laminates used to manufacture flooring products include a plurality of layers, including a fiberboard or organic composite core section, a decorative layer, and a hard and flat protective wear layer of resin-impregnated melamine material.

The wear layer of the laminate in such systems is typically clear, such that the aesthetic appearance, including any color and/or printed image of the decorative layer, is not obscured by the wear layer. Further, the top surface of the wear layer is typically flat, such that the flooring panel exhibits a two-dimensional appearance to the onlooker. Thus, while the decorative layer may exhibit an appearance that simulates "natural" flooring materials such as hardwood or ceramic tile, the typical laminate wear layer simply allows an unobstructed view of the laminate decorative layer, and does not add to or enhance the aesthetic properties of the flooring panel.

Some prior art laminate flooring systems have included barely-perceptible indentations imparted to the laminate wear layer to interrupt the aforementioned two-dimensional appearance. Those systems feature shallow indentations of a depth not exceeding 0.25 millimeters ("mm"). Further, the location of individual indentations or the "pattern" of indentations provided in prior art systems are unrelated and unlinked to the aesthetic image provided by the decorative laminate layer. Thus, any indentation pattern in prior art laminate wear layers is not related in any way to the selected aesthetic appearance of the decorative laminate layer.

SUMMARY OF THE INVENTION

The present invention, in one embodiment, is a decorated floor panel including a core having a top surface and an opposite bottom surface. A decorative layer is adhered to the top surface of the core and, in one embodiment, substantially covers the core. A desired aesthetic appearance, such as a hardwood or ceramic tile appearance, is displayed by the decorative layer of the laminate. Finally, a wear layer is provided over the decorative layer, substantially covering the decorative layer and providing protection from the ambient environment. The wear layer has an exposed wear surface with depressions therein of a variable depth below the wear surface, the depressions being arranged to display a desired texture pattern.

In another aspect, the present invention is a decorated floor panel as set forth above, wherein the depressions in the wear surface have a depth of at least 0.50 mm below the nominal surface of the wear layer. In this embodiment, the depressions may all be of a constant depth or, alternatively, of a variable depth as exists for the embodiment discussed above.

In yet another aspect, the present invention is a decorated floor panel in which the decorative layer is provided with a decorative pattern. In one embodiment, a plurality of depressions imparted to the wear layer form a desired texture pattern thereon. The relative orientation of the texture pattern and the decorative pattern is controlled such that the depression pattern and the texture pattern are substantially in registration, creating an enhanced, three-dimensional aesthetic appearance to the decorated floor panel.

In yet another aspect, the present invention is a floor system comprised of a plurality of individual decorated floor panels assembled together and interlocking with each other by tongue and groove engagement, which is not visible after the floor panels are assembled.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a," "an," or "the" can mean one or more, depending upon the context in which it is used. The preferred embodiment is now described with reference to the figures, in which like numbers indicate like parts throughout the figures.

Figure 1:
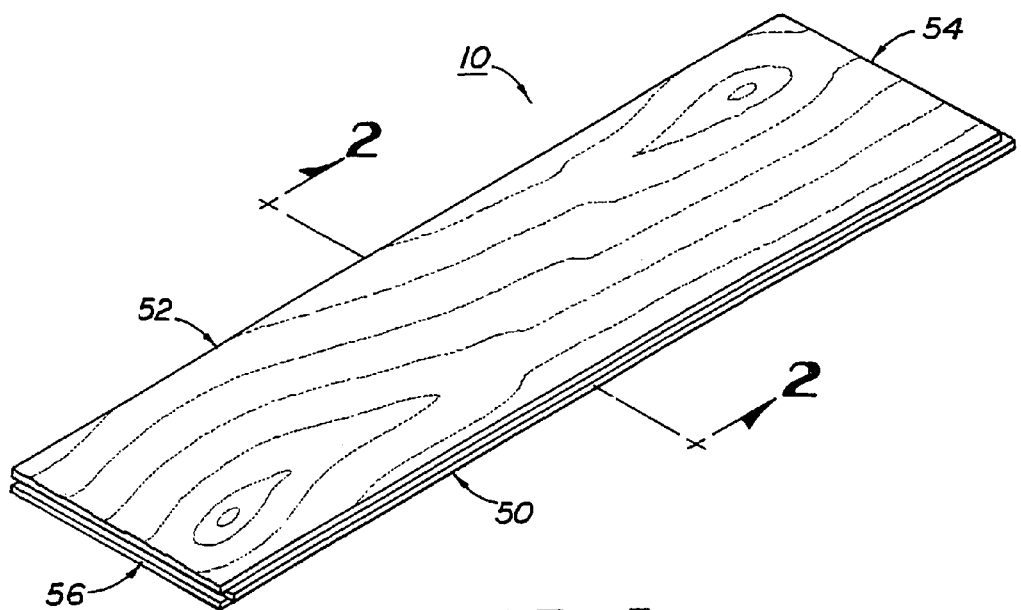
FIG. 1 is a perspective view of an embodiment of the decorated floor panel according to the present invention.

Referring to FIG. 1, the present invention, in one embodiment, is a decorated floor panel 10. In the illustrated embodiment, the panel 10 is manufactured from a laminated material having a fiberboard core. Alternatively, the floor panel 10 of the invention may be manufactured from other materials, including other laminates such as high pressure laminate ("HPL"), which have been marketed under such trade names as Formica and Pergo. Other materials may also be utilized to construct the floor panel, such as other natural, recycled or synthetic materials.

Figure 3:
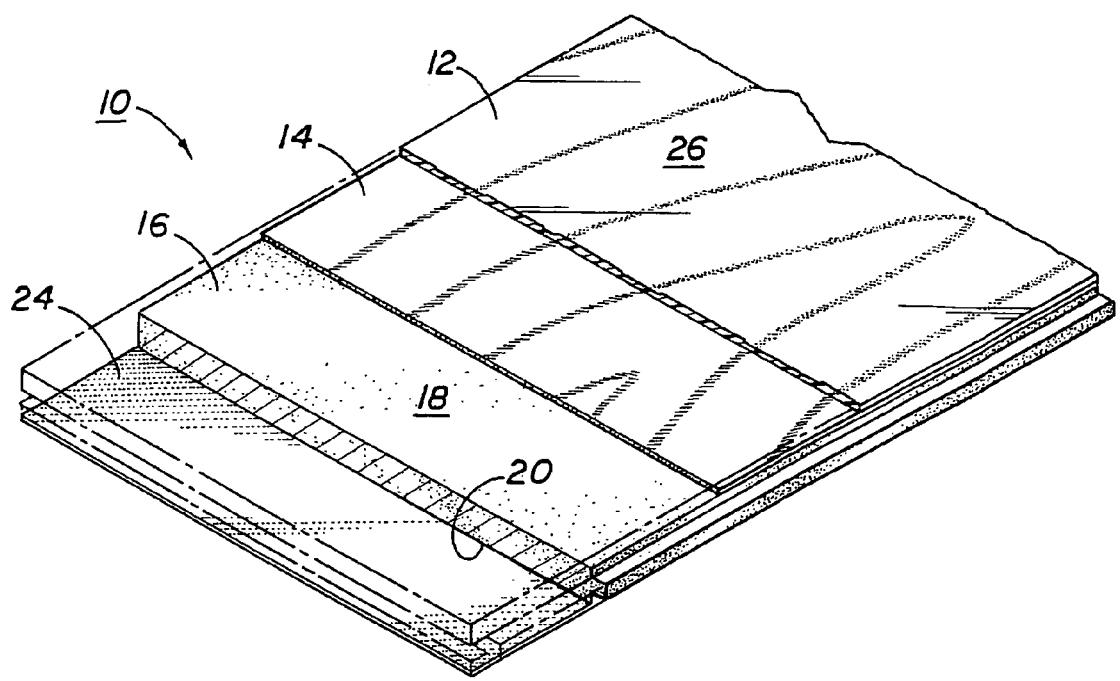
FIG. 3 is a perspective cut-away view of an embodiment of the decorated floor panel according to the present invention.

The fiberboard core laminate illustrated in FIG. 3 includes a plurality of discrete layers, including a wear layer 12, a decorative layer 14, a core 16 and a backing layer 24. The illustrated core 16 is preferably manufactured of fiberboard, such as that marketed by companies including Louisiana Pacific, Georgia Pacific, Temple Inland and Weyerhauser. The presently preferred fiberboard core material is formed of high density fiberboard, which is a hardwood/softwood fiber compound compressed at 900-960 kg/m3. The preferred fiberboard core material is usually available in 4 or 5 feet widths and lengths of up to 18 feet. In other embodiments, cores 16 of different materials or having different properties may be utilized, including other timber-based products, such as plywood, chipboard or particleboard.

Figure 2:
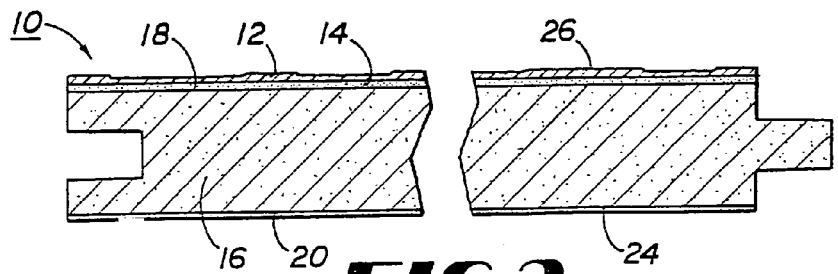
FIG. 2 is a section taken along lines 2-2 in FIG. 1.

Referring now to FIGS. 2 and 3, the core 16 has a top surface 18 and an opposite bottom surface 20. When installed, the bottom surface 20 of the core 16 faces the underlying subfloor (not shown). FIG. 3 illustrates an embodiment having an optional backing layer 24 adhered to the bottom surface 20 of the core 16. Because the illustrated fiberboard core is not completely impervious to moisture and contaminants, such a backing layer 24 may be provided to improve moisture resistance of the floor panel 10. Additionally, the backing layer 24 may improve structural integrity of the floor panel 10 by increasing overall thickness and reducing the warp and wear tendencies of uncoated core material. In one embodiment, a clear backing layer 24 of melamine, reinforced with aluminum oxide (AlO2) and impregnated with a thermosetting resin, is utilized. In such an embodiment, an optional layer (not shown) may be interposed between the bottom surface 20 of the core 16 and the backing layer 24. In one embodiment, the optional layer is constructed of paper. The optional layer may display a printed image, such as a trademark, product number or name, or any other desired marking or designation. In other embodiments, backing layers 24 may be constructed of other materials providing suitable moisture resistance, such as phenolic resins or other natural, synthetic or recycled materials.

A decorative layer or "decor" layer 14 is adhered, joined, or coupled to the top surface 18 of the core 16 by a chemical adhesive, mechanical connection, or other means known in the art. In the illustrated embodiment, the decorative layer 14 is a sheet of paper that substantially covers the top surface 18 of the core 16. Thus, in the illustrated embodiment, the top and bottom surfaces 18, 20 of the core 16 are covered by the decorative layer 14 and the backing layer 24, respectively. The visible side of the decorative layer 14, i.e., the side not adhered to the core 16, is capable of displaying a desired aesthetic appearance, such as a color or pattern. Virtually any color or pattern may be imparted to the decorative layer 14. For example, currently contemplated patterns include simulated hardwood flooring and simulated ceramic tile, each in a variety of styles, shades and colors. Currently contemplated simulated hardwood styles include pine, heart pine, cherry, maple, beech, oak and mahogany. Simulated tile appearances are contemplated in a range of styles, including a variety of marble and ceramic tile colors, including groutlines in ceramic tile styles. Other currently contemplated patterns include floral patterns, abstract designs, geometric designs and company logos. Other patterns may be selected by the manufacturer or user according to aesthetic preference or design objectives.

As mentioned above, in one embodiment the decorative layer 14 is manufactured from paper that may be impregnated with a thermosetting resin and provided with the desired aesthetic color and/or pattern. In other embodiments that are not shown, other materials may make up the decorative layer 14, such as real wood veneer, pulverized stone, or other materials. Additionally, it is possible to achieve a similar decorative appearance by either a direct or indirect printing process directly onto the top surface 18 of the core 16. In such an embodiment, the decorative layer 14 comprises whatever ink, dye, pigment or other marking substance applied to the core 16. Alternatively, the decorative appearance may be provided by etching, burning or otherwise marring the top surface 18 of the core 16. Any such treatment that supplies such a decorative appearance on the top surface 18 of the core 16 is contemplated to comprise the decorative layer 14 as defined herein.

Referring now to FIG. 3, a wear layer 12 is provided over the decorative layer 14, substantially covering the decorative layer 14 and providing protection from the ambient environment. The wear layer 12 is adhered, joined, or coupled to the decorative layer 14, just as the decorative layer 14 is joined to the underlying core 16. In one embodiment, the wear layer 12 is comprised of a melamine sheet, reinforced with aluminum oxide (AlO2) and impregnated with a thermosetting resin. It is preferred, though not required, that the material selected to comprise the wear layer 12 be the same or similar material as that selected to comprise the backing layer 24, if a backing layer 24 is utilized. Using "matched" materials for those layers has been found to minimize "warping" and "bowing" of the laminate material.

Alternatively, a layer of varnish or a UV curable scratch resistant coating may be used in place of the melamine sheet to comprise the wear layer 12. As further alternatives, other materials providing suitable moisture resistance and resilience to loads and wear to which a floor is subjected may be utilized, such as phenolic resins or other natural, synthetic or recycled materials.

After manufacture of the laminate material, the wear layer 12 is substantially transparent, so that the aesthetic appearance of the decorative layer 14 is substantially unobstructed by the wear layer 12. It has been determined that the inclusion of a wear layer 12 as the outermost layer of the laminate generally improves the resistance of the floor panel 10 to wear, including staining or fading of the aesthetic image imparted to the decorative layer 14.

Figure 5:
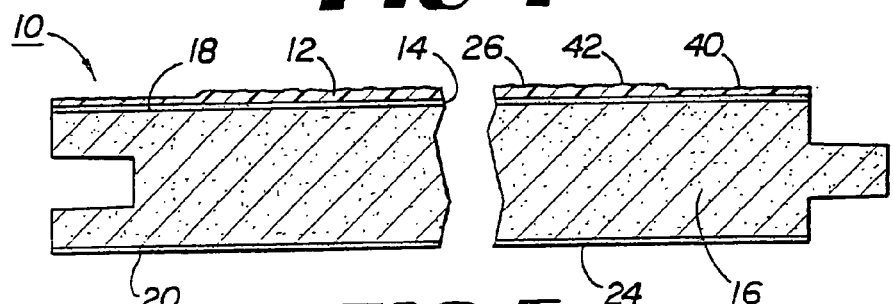
FIG. 5 is a section taken along lines 5-5 in FIG. 4.

As illustrated in FIGS. 2 and 5, the outermost wear surface 26, i.e., the top surface of the wear layer 12 that is exposed to the ambient environment, is provided with a textured surface condition. Thus, in addition to the decorative aesthetic image displayed by the decorative layer 14, further aesthetic effect may be achieved by imparting depressions of a constant or variable depth to the wear surface 26, arranged to display a desired texture pattern. For example, in the embodiment illustrated in FIG. 1 in which the decorative pattern is a wood grain, a texture pattern featuring depressions designed to simulate wood grain may be provided. As a further example, in an embodiment in which the decorative pattern is a simulated ceramic tile having tile portions surrounded by groutlines, a texture pattern having an irregular simulated stone texture and roughened or non-smoothed depressions to simulate recessed grout may be provided. These examples are merely illustrative and are not intended to be exhaustive. Other decorative patterns and texture patterns may be selected by the manufacturer or user according to aesthetic preference or design objectives. When referencing depressions, one skilled in the art will appreciate that this term excludes the edges circumscribing the panel and instead encompasses "depressions" within the periphery of the edges.

Figure 1A:
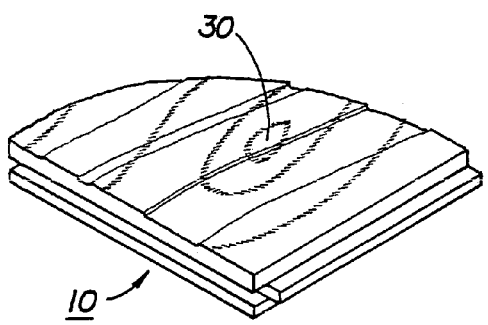
FIG. 1A is an enlarged fragmentary view of an embodiment of the decorated floor panel of FIG. 1, the texture pattern being represented out of registration with the decorative pattern.

In the embodiment shown in FIG. 1A, the texture pattern is imparted to the floor panel 10 without regard to the positioning of the decorative pattern. Thus, in this embodiment, the wood grain pattern displayed in the decorative layer 14 (depicted in dashed lines in FIG. 1A) does not necessarily "match," register with, or correspond to the wood grain pattern imparted as three-dimensional texture in the wear layer 12 (depicted in solid lines in FIG. 1A).

Figure 1B:
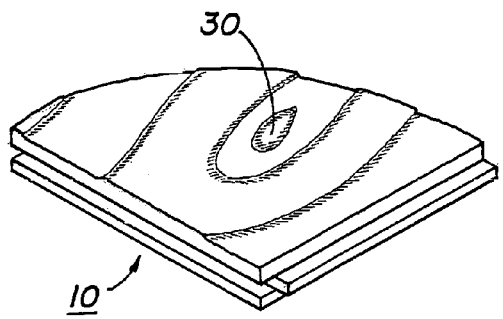
FIG. 1B is an enlarged fragmentary view of an embodiment of the decorated floor panel of FIG. 1, the texture pattern being represented in registration with the decorative pattern.

In another embodiment, shown in FIG. 1B, the texture pattern and the decorative pattern may be controlled during the manufacturing process such that the patterns "match." In the hardwood floor panel example, therefore, the textured grain pattern may be imparted to wear layer 12 (solid lines) in registration with the visible grain pattern in the decorative layer 14 (dashed lines). In such an embodiment, lines of depression in the wear layer 12 are located adjacent or substantially on top of the printed grain lines in the decorative layer 14 of the laminate, providing an enhanced and more realistic aesthetic appearance.

As a further example, "knothole" patterns 30 in the decorative layer 14 are substantially overlaid by correspondingly shaped depressions in the wear layer 12 in FIG. 1B. Thus, in this embodiment, the hard wood flooring design displayed by the decorative layer 14 includes the visual appearance of at least one knothole 30. The wear surface 26 has at least one depression therein in registration with the knothole 30. The knothole 30 may be of a variety of shapes. In one embodiment, the knothole 30 is substantially circular, and the corresponding depression in registration with the knothole 30 is also substantially circular in top plan view. Other embodiments are contemplated in which the knothole 30 has other shapes, such as an oval shape or some irregular shape similar to those found in natural hardwood planks. Such alternate embodiments are within the scope of the present invention.

In a currently contemplated hardwood embodiment, the depressions in the wear layer 12 in registration with the decorative pattern are imparted to a depth of at least 0.30 mm below the wear surface 26. In another contemplated embodiment, the depressions in the wear layer 12 in registration with the decorative pattern are imparted to a depth of at least 0.50 mm below the wear surface 26. In still another contemplated embodiment, the depressions are imparted to a depth of at least 1.0 mm below the wear surface 26. In yet other contemplated embodiments, the depressions are imparted to a depth of at least 1.50 mm, 2.0 mm, 2.50 mm, or 3.0 mm, respectively, below the wear surface 26. The possible width of the depressions is unlimited, but in presently preferred embodiments, widths of between approximately 1.0 mm and 25.0 mm have been utilized.

Figure 4:
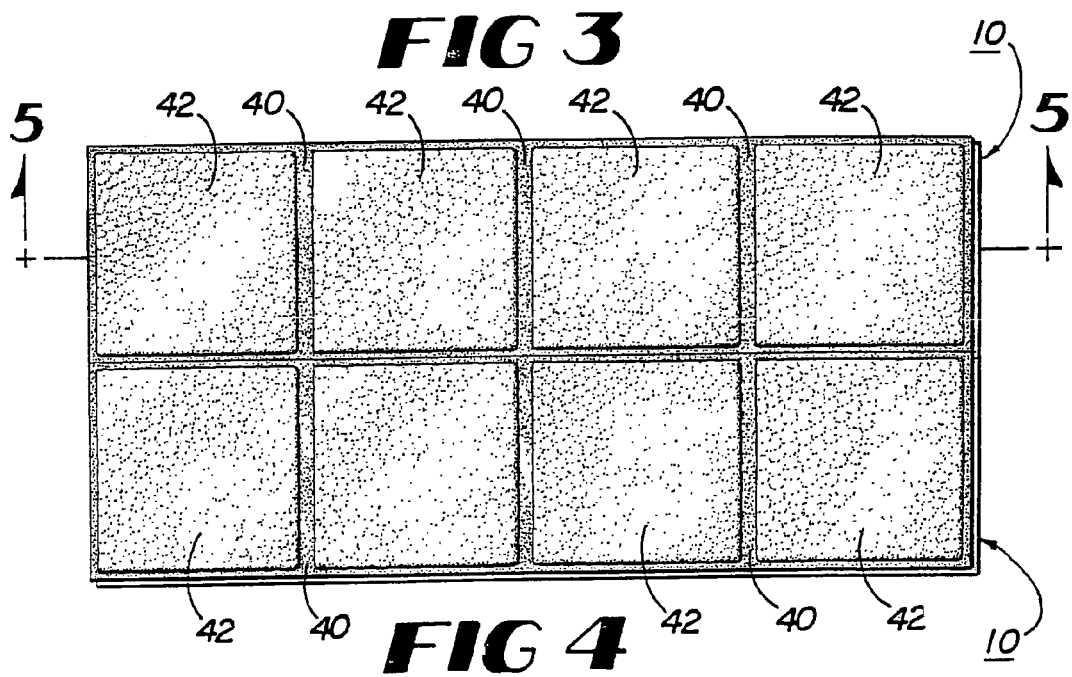
FIG. 4 is a perspective view of a group of decorated floor panels according to the present invention assembled to form a portion of a floor system.

Similarly, in the simulated ceramic tile embodiment shown in FIGS. 4 and 5, the texture pattern may be imparted to the wear layer 12 in registration with the image imparted to the decorative layer 14. In one embodiment, the ceramic tile design of the decorative layer 14 includes the visual appearance of at least one groutline 40, and the wear layer 12 has at least one depression therein in registration with the groutline 40. In embodiments where the groutline 40 imparted to the decorative layer 14 is substantially square in shape, the corresponding depression in registration with the groutline 40 is also substantially square in top plan view. In another embodiments, the groutline 40 may be provided in any selected pattern, including but not limited to triangular, hexagonal, octagonal, or other patterns. Such alternate embodiments are within the scope of the present invention.

In a currently contemplated simulated ceramic tile embodiment, the depressions in the wear layer 12 in registration with the groutline 40 are imparted to a depth below the wear surface 26 of at least 0.30 mm. In another contemplated embodiment, the depressions in the wear layer 24 in registration with the groutline 40 are imparted to a depth below the wear surface 26 of at least 0.50 mm. In still another contemplated embodiment, the depressions are imparted to a depth below the wear surface 26 of at least 1.0 mm. In yet other contemplated embodiments, the depressions are imparted to a depth of at least 1.50 mm, 2.0 mm, 2.5 mm, or 3.0 mm, respectively, below the wear surface 26. The possible width of the depressions is unlimited, but in presently preferred embodiments, widths of between approximately 5.0 mm and 10.0 mm have been utilized.

Also in simulated ceramic tile embodiments of the present invention, a "rough" simulated stone texture may be imparted to the areas of the wear layer 12 overlaying the simulated stone image 42 in the decorative layer 14. Further, any recessed depression in the wear layer 12 substantially overlaying the simulated groutline 40 in the decorative layer 14 may be provided with a "rough" simulated grout texture that is non-smooth visually and to the touch. This non-smooth and "rough" appearance more closely emulates the appearance of stone.

The selected texture pattern is usually, though not always, imparted to the wear layer 12 in a single manufacturing step, at the time the laminate layers are laminated together. In such an embodiment, the various laminate layers are positioned within a press (not shown) having a caul plate (also not shown) provided with an inverse impression of the selected texture pattern. After the laminate layers are positioned within the press, the caul plate is lowered to contact the wear layer 12 of the laminate. In a single step, under heat and pressure for a selected period of time, the layers are laminated together and the texture pattern is imparted to the wear layer 12 by the action of the caul plate. Through experimentation, it has been noted that satisfactory results may be obtained by the application of between 380-420 psi at between 350° F.-400° F. for a period of 18-60 seconds. These parameters are set forth by way of example only for an approximately 6.0 mm thick melamine wear layer product sold by the Mead Corporation. It is expected that any of these parameters will vary depending on the degree and depth of depressions sought to be imparted to the wear layer or depending on the characteristics of the selected wear layer material. One skilled in the art will appreciate that after experimentation, other parameters may produce similarly satisfactory results.

Alternatively, the texture pattern may be imparted to the wear layer 12 in a separate operation, after lamination of the various layers into a single workpiece.

The depth to which the wear layer 12 is depressed to provide the full texture patterns may be controlled during the manufacturing process. It is contemplated that to provide the most beneficial texture pattern, depressions of a depth at least 0.25 mm should be imparted to the wear layer 12. More specifically, depressions of between 0.30 mm and 5.75 mm in depth, more preferably between 1.0 mm and 5.75 mm in depth, and most preferably between 1.5 mm and 5.75 mm in depth, measured from the nominal surface of the wear layer 12, have been found to provide the greatest aesthetic effect while not diminishing performance of the overall floor system. These ranges are applicable in embodiments in which a melamine wear layer of approximately 6.0 mm thickness, manufactured by the Mead Corporation, is utilized. It has been found that depressions of a depth up to 0.25 mm less than the nominal thickness of such a wear layer 12 may be achieved using the above-described manufacturing methods; that is, if the nominal thickness is 5.0 mm, then the deepest depressions preferably should be no greater than 4.75 mm. In another preferred embodiment, the deepest depressions should be of a depth up to 0.50 mm less than the nominal thickness of the wear layer 12.

It is expected that if other thicknesses, materials or manufacturing methods are selected to comprise the wear layer 12, different preferred ranges may exist for each selected material.

Additional process controls or equipment may be required to manufacture flooring panels 10 according to embodiments of the invention in which substantial registration between the decorative pattern and the texture pattern are required. In a presently preferred embodiment, a short-cycle press manufactured by Wemhoner and operated by Stiles Machinery, 3965 44th St. S.E., Grand Rapids, Mich. 49512 has been found satisfactory for achieving such registration between the decorative pattern and the texture pattern.

During the manufacturing process, in one embodiment, the various separate layers are assembled in preparation for lamination. In the embodiment shown in FIG. 3, for example, a backing layer 24, a core 16, a decorative layer 14 and a wear layer 12 are stacked together before entering the press. Through processing equipment controls such as a single sheet alignment system and electrostatic bonding of the various laminate layers prior to entry into the press, alignment between the decorative pattern displayed by the decorative layer 14 and the texture pattern imparted to the wear layer 12 by the caul plate may be achieved within a tolerance of 0.125 inches.

As illustrated in FIG. 5, individual floor panels 10 according to the invention may be assembled to form a complete floor system. To facilitate assembly, individual floor panels may be provided with means for interlocking with adjacently placed panels. As shown in FIG. 1, each floor panel 10 may include a first pair of parallel sides 50, 52 having tongue and groove cuts along the first and second parallel sides 50, 52, respectively. Each such floor panel 10 further includes a second pair of parallel sides 54, 56, perpendicular to each of the first pair of parallel sides 50, 52, also having tongue and groove cuts. Thus, each such floor panel 10 is capable of interlocking engagement with an adjacent panel. Alternatively, locking edge connections, such as that described in U.S. Pat. No. 6,006,486 to Moriau et al. (which is incorporated herein in its entirety by reference), may be utilized to form a floor covering system in which neighboring floor panels 10 are detachably secured to one another through a mechanical interlock.

Along the edges of the floor system, perimeter panels may be cut to length as needed to fit the installation environment and fitted with matching trim pieces (not shown) to provide an aesthetically attractive fit adjacent walls, stairs, doorways or other obstructions or transition areas.

In a presently preferred embodiment, individual floor panels 10 are manufactured to a width of 11½ inches and a length of 46 1/16 inches, with an approximate thickness of 5/16 inches. One skilled in the art will appreciate that other panel sizes may be used without departing from the scope of the invention.

Although the present invention has been described with reference to specific details of certain embodiments thereof, it is not intended that such details should be regarded as limitations upon the scope of the invention except as and to the extent that they are included in the accompanying claims.

What is claimed is:

1. A decorated floor panel comprising:
    a. a timber-based core having a top surface and an opposite bottom surface;
    b. a decorative layer coupled to the top surface of the core, the decorative layer having a desired aesthetic pattern; and
    c. a wear layer coupled to and substantially covering the decorative layer for protecting the decorative layer,
    the wear layer having an exposed wear surface with a plurality of discrete depressions therein, at least one of said discrete depressions having a variable depth below the wear surface, the depressions being arranged in registration with the desired aesthetic pattern to thereby display a desired textured pattern.

2. The decorated floor panel of claim 1, wherein the panel includes a first pair of parallel sides, wherein the parallel sides have tongue and groove cuts along the parallel sides to provide interlocking engagement.

3. The decorated floor panel of claim 2, wherein the panel includes a second pair of parallel sides, the second pair of parallel sides being perpendicular to each of the first pair of parallel sides and wherein the second pair of parallel sides have tongue and groove cuts to provide interlocking engagement.

4. The decorated floor panel of claim 1, wherein the core comprises fiber board.

5. The decorated floor panel of claim 1, wherein the decorative layer comprises paper and substantially covers the top surface of the core.

6. The decorated floor panel of claim 1, wherein the wear layer comprises melamine reinforced with aluminum oxide.

7. The decorated floor panel of claim 1, further comprising a backing layer coupled to and substantially covering the bottom surface of the core as a reinforcing element.

8. The decorated floor panel of claim 7, wherein the backing layer comprises melamine reinforced with aluminum oxide.

9. The decorated floor panel of claim 1, wherein the aesthetic pattern of the decorative layer is a hardwood flooring design.

10. The decorated floor panel of claim 9, wherein the hardwood flooring design includes the visual appearance of at least one knothole, and wherein the wear surface has at least one depression therein in registration with the knothole.

11. The decorated floor panel of claim 10, wherein the knothole is substantially circular and wherein the corresponding depression in registration with the knothole is also substantially circular in top plan view.

12. The decorated floor panel of claim 1, wherein the aesthetic pattern of the decorative layer is a ceramic flooring tile design.

13. The decorated floor panel of claim 12, wherein the ceramic flooring tile design includes the visual appearance of at least one groutline, and wherein the wear surface has at least one depression therein in registration with the groutline.

14. The decorated floor panel of claim 13, wherein the groutline is substantially square and wherein the corresponding depression in registration with the groutline is also substantially square in top plan view.

15. The decorated floor panel of claim 13, wherein the corresponding depression in registration with the groutline has a non-smooth and rough texture.

16. The decorated floor panel of claim 1, wherein at least one depression in the wear surface reaches a depth of at least 0.50 millimeters.

17. The decorated floor panel of claim 1, wherein at least one depression in the wear surface reaches a depth of at least 1.0 millimeters.

18. The decorated floor panel of claim 1, wherein at least one depression in the wear surface reaches a depth of at least 1.50 millimeters.

19. The decorated floor panel of claim 1, wherein at least one depression in the wear surface reaches a depth of at least 2.0 millimeters.

20. The decorated floor panel of claim 1, wherein at least one depression in the wear surface reaches a depth of at least 2.50 millimeters.

21. The decorated floor panel of claim 1, wherein at least one depression in the wear surface reaches a depth of at least 3.0 millimeters.

22. A decorated floor panel comprising:
   a. a timber-based core having a top surface and an opposite bottom surface;
   b. a decorative layer coupled to the top surface of the core, the decorative layer having an appearance of a hardwood flooring design including at least one knothole; and
   c. a wear layer coupled to and substantially covering the decorative layer for protecting the decorative layer,
   the wear layer having an exposed wear surface with a plurality of discrete depressions therein, at least one of said discrete depressions having a variable depth below the wear surface, the depressions being arranged to display a desired textured pattern including at least one depression in registration with the knothole.

23. A floor system including at least two interlocking panels, each panel comprising:
   a. a timber-based core having a top surface, an opposite bottom surface, a first pair of parallel sides having tongue and groove cuts and a second pair of parallel sides having tongue and groove cuts, each of the second pair of parallel sides being perpendicular to each of the first pair of parallel sides;
   b. a decorative layer coupled to the top surface of the core, the decorative layer having a desired aesthetic pattern; and
   c. a wear layer coupled to and substantially covering the decorative layer for protecting the decorative layer,
   the wear layer having an exposed wear surface with a plurality of discrete depressions therein, at least one of said discrete depressions having a variable depth below the wear surface, the depressions being arranged in registration with the desired aesthetic pattern to thereby display a desired textured pattern.

24. A decorated floor panel comprising:
   a. a timber-based core having a top surface and an opposite bottom surface;
   b. a decorative layer coupled to the top surface of the core, the decorative layer having a desired aesthetic pattern; and
   c. a wear layer having a thickness and being coupled to and substantially covering the decorative layer for protecting the decorative layer,
   the wear layer having an exposed wear surface with at least one depression in registration with the desired aesthetic pattern that extends a varying depth of at between least 0.50 millimeters below the wear surface and up to 0.25 millimeters less than the thickness of the wear layer.

25. The decorated floor panel of claim 24, wherein at least one depression in the wear surface extends at least 0.50 millimeters below the wear surface and to a depth up to 0.50 millimeters less than the thickness of the wear layer.

\* \* \* \* \*